United States Patent
Lim et al.

(10) Patent No.: US 10,033,998 B2
(45) Date of Patent: Jul. 24, 2018

(54) METHOD AND APPARATUS FOR EFFECTIVE ENCODING/DECODING USING DETAILED PREDICTIVE UNIT

(71) Applicant: SK TELECOM CO., LTD., Seoul (KR)

(72) Inventors: Jeongyeon Lim, Seongnam-si (KR); Joong Gunn Park, Suwon Si (KR); Yunglyul Lee, Seoul (KR); Joohee Moon, Seoul (KR); Haekwang Kim, Seoul (KR); Byeungwoo Jeon, Seongnam-si (KR); Jongki Han, Seoul (KR); Ryeonghee Kwon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/477,662

(22) Filed: Apr. 3, 2017

(65) Prior Publication Data
US 2017/0208326 A1 Jul. 20, 2017

Related U.S. Application Data

(63) Continuation of application No. 14/282,462, filed on May 20, 2014, now Pat. No. 9,674,520, which is a
(Continued)

(30) Foreign Application Priority Data

Nov. 24, 2011 (KR) .................. 10-2011-0123839
Nov. 23, 2012 (KR) .................. 10-2012-0133508

(51) Int. Cl.
*H04N 19/119* (2014.01)
*H04N 19/176* (2014.01)
(Continued)

(52) U.S. Cl.
CPC .......... *H04N 19/103* (2014.11); *G06T 9/004* (2013.01); *H04N 1/417* (2013.01); *H04N 19/119* (2014.11);
(Continued)

(58) Field of Classification Search
CPC ..... H04N 19/52; H04N 19/157; H04N 19/103
See application file for complete search history.

(56) References Cited

U.S. PATENT DOCUMENTS

2011/0243222 A1   10/2011  Choi et al.
2012/0008676 A1*   1/2012  Lee ..................... H04N 19/137
                                                    375/240.02
(Continued)

FOREIGN PATENT DOCUMENTS

KR   1020070093305 A   9/2007
KR   1020100037180 A   4/2010
(Continued)

OTHER PUBLICATIONS

International Search Report dated Feb. 20, 2013 for PCT/KR2012/009966.

*Primary Examiner* — Obafemi Sosanya
(74) *Attorney, Agent, or Firm* — Hauptman Ham, LLP

(57) ABSTRACT

An apparatus for encoding images includes: a predictor to determine a prediction unit (PU) mode among a plurality of PU modes indicating types of partition of a current coding unit (CU) into one or more prediction units (PUs), and generate a predicted block of the current CU by performing an intra prediction or an inter prediction for each PU of the determined PU mode, wherein a size of the current CU is 2N×2N, and the plurality of PU modes includes 2N×hN or hN×2N PU mode in which the current CU is partitioned into PUs respectively having a size of 2N×hN or hN×2N, h being a fractional number smaller than 1; a subtractor to subtract the predicted block from the current CU to generate a
(Continued)

residual block; a transformer to transform the residual block into a frequency domain to generate a frequency one or more transform blocks.

2 Claims, 11 Drawing Sheets

Related U.S. Application Data continuation of application No. PCT/KR2012/009966, filed on Nov. 23, 2012.

(51) Int. Cl.
| | |
|---|---|
| *H04N 19/513* | (2014.01) |
| *H04N 19/61* | (2014.01) |
| *H04N 19/103* | (2014.01) |
| *H04N 1/417* | (2006.01) |
| *G06T 9/00* | (2006.01) |
| *H04N 19/52* | (2014.01) |
| *H04N 19/137* | (2014.01) |

(52) U.S. Cl.
CPC ......... *H04N 19/176* (2014.11); *H04N 19/513* (2014.11); *H04N 19/61* (2014.11)

(56) References Cited

U.S. PATENT DOCUMENTS

| | | | |
|---|---|---|---|
| 2013/0022122 A1* | 1/2013 | Oh | H04N 19/56 375/240.16 |
| 2013/0077691 A1* | 3/2013 | Zheng | H04N 19/105 375/240.16 |
| 2013/0136183 A1* | 5/2013 | Kim | H04N 19/52 375/240.16 |

FOREIGN PATENT DOCUMENTS

| | | |
|---|---|---|
| KR | 1020110061509 A | 6/2011 |
| KR | 1020110112165 A | 10/2011 |

* cited by examiner

2NxhN

2NxN hNx2N

Nx2N

2NxhN

2NxnU hNx2N nLx2N

2NxhN

2NxnD hNx2N nRx2N

METHOD AND APPARATUS FOR EFFECTIVE ENCODING/DECODING USING DETAILED PREDICTIVE UNIT

CROSS-REFERENCE TO RELATED APPLICATION

The present application is a continuation of U.S. patent application Ser. No. 14/282,462 filed on May 20, 2014, which is a continuation of International Patent Application No. PCT/KR2012/009966, filed Nov. 23, 2012, which claims priorities to Korean Patent Application No. 10-2011-0123839, filed on Nov. 24, 2011 and Korean Patent Application No. 10-2012-0133508, filed on Nov. 23, 2012. The disclosures of the above-listed application are hereby incorporated by reference herein in their entirely.

FIELD

The present disclosure relates to an apparatus and a method for encoding/decoding video which improve the coding performance in the process of an inter prediction from a reference frame on the basis of coding unit (CU).

BACKGROUND

The statements in this section merely provide background information related to the present disclosure and do not constitute prior art. Further, as the statements in this section describe a technology corresponding to the background information, the contents of the background art are incorporated into the method and apparatus for encoding/decoding according to some embodiments of the present disclosure. Video compression technology experts gathered by MPEG (moving picture experts group) and VCEG (video coding experts group) have formed their joint team called JCT-VC (joint collaborative team on video coding). JCT-VC is working for the standardization of the proposed standard called HEVC (high efficiency video coding) toward the development of a new high-quality, high-performance and high-efficiency video compression technology with improved compression performance of about 50% or more than the state of H.264/AVC (advanced video coding). HEVC has been started with the aim of achieving a high quality/high performance compression technology with a compression rate that has been improved over the technology of the existing H.264/AVC and adopted various methods of encoding, leading to a significant development in terms of improving the image quality and performance than the existing standard technology.

SUMMARY

In accordance with some embodiments of the present disclosure, an apparatus for encoding images comprises a predictor, a subtractor, a transformer, a quantizer and a bitstream generator. The predictor is configured to determine a prediction unit (PU) mode among a plurality of PU modes indicating types of partition of a current coding unit (CU) into one or more prediction units (PUs), and generate a predicted block of the current CU by performing an intra prediction or an inter prediction for each PU of the determined PU mode, wherein a size of the current CU is 2N×2N, and the plurality of PU modes includes 2N×hN or hN×2N PU mode in which the current CU is partitioned into PUs respectively having a size of 2N×hN or hN×2N, h being a fractional number smaller than 1. The subtractor is configured to subtract the predicted block from the current CU to generate a residual block. The transformer is configured to transform the residual block into a frequency domain to generate one or more transform blocks. The quantizer is configured to quantize the transform blocks. And the bitstream generator is configured to encode the quantized transform blocks and information on the determined PU mode into a bitstream.

In accordance with some embodiments of the present disclosure, an apparatus for decoding images comprises a decoder, an inverse quantizer, an inverse transformer, a predictor and an adder. The decoder is configured to decode one or more quantized transform blocks from a bitstream and extract PU mode information indicating a prediction unit (PU) mode of a current coding unit (CU) among a plurality of PU modes relating to types of partition of the current CU into PUs, wherein a size of the current CU is 2N×2N and the plurality of PU modes include 2N×hN or hN×2N PU mode in which the current CU is partitioned into PUs respectively having a size of 2N×hN or hN×2N, h being a fractional number smaller than 1. The inverse quantizer is configured to inversely quantize the quantized transform blocks to generate transform blocks. The inverse transformer is configured to inversely transform the transform blocks to reconstruct a residual block of the current CU. The predictor is configured to generate a predicted block of the current CU by predicting each PU within the current CU based on the PU mode information. And the adder is configured to add the reconstructed residual block and the generated predicted block to thereby reconstruct the current CU.

DETAILED DESCRIPTION

Figure 1:
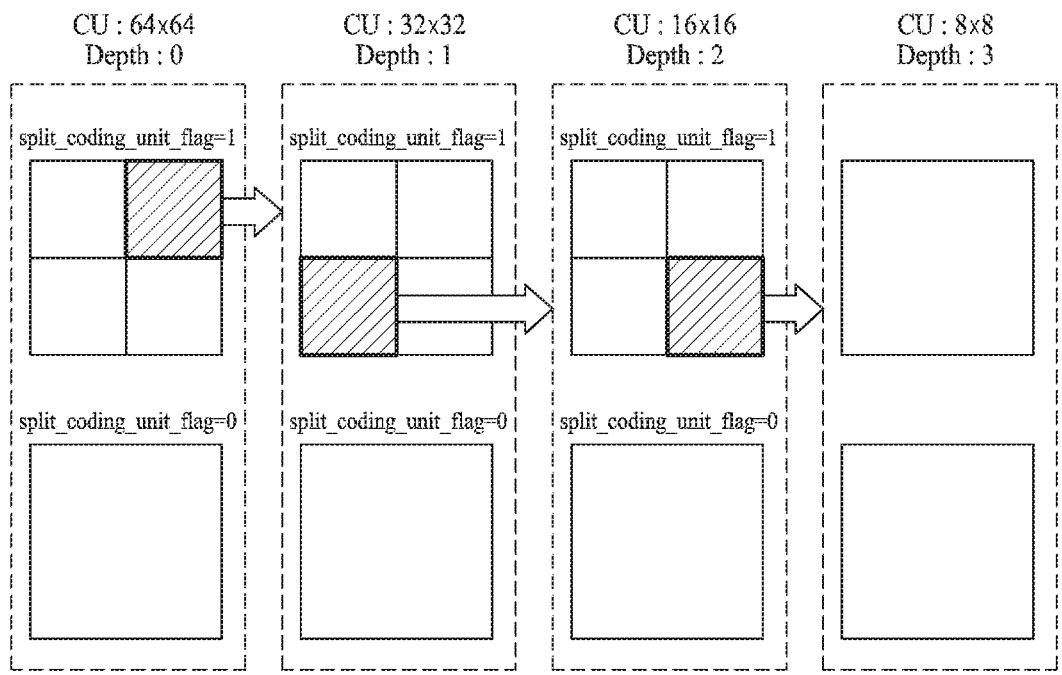
FIG. 1 a diagram of an example CU which is a coding unit.
Figure 1:
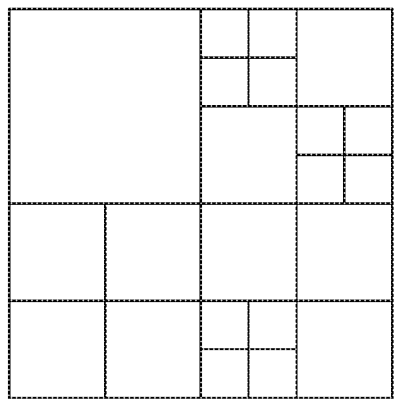

Hereinafter, a video encoding apparatus and/or a video decoding apparatus according to one or more embodiments correspond to a user terminal device ("terminal device" will be hereinafter referred to as "terminal") such as a PC (personal computer), notebook computer, PDA (personal digital assistant), PMP (portable multimedia player), PSP (PlayStation Portable), wireless communication terminal, smart phone, TV and the like. A video encoding apparatus and/or a video decoding apparatus according to one or more embodiments are a server terminal such as an application server, service server and the like. A video encoding apparatus and/or a video decoding apparatus according to one or more embodiments mean various apparatuses each including (a) a communication apparatus such as a communication modem and the like for performing communication with various types of devices or a wired/wireless communication networks, (b) a memory for storing various programs and data that encode or decode a video or perform an inter/intra-prediction for encoding or decoding, and (c) a microprocessor to execute a program so as to perform calculation and controlling, and the like.

Further, a video encoded into a bitstream by the video encoding apparatus is transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like. According to one or more embodiments, the bitstream is decoded in the video decoding apparatus and is reconstructed to a video, and the video is played back.

In general, a video is formed of a series of pictures (also referred to herein as "images" or "frames"), and each picture is divided into predetermined regions such as blocks. The divided blocks are classified into an intra block or an inter block depending on an encoding scheme. The intra-block refers to a block that is encoded based on an intra-prediction coding scheme. The intra-prediction coding scheme predicts pixels of a current block by using pixels of blocks that were encoded and decoded to be reconstructed in a current picture to which encoding is to be performed, so as to generate a predicted block, and encodes pixel differences between the predicted block and the current block. The inter-block means a block that is encoded based on an inter-prediction coding scheme. The inter-prediction encoding scheme predicts a current block in a current picture referring to at least one previous picture and/or at least one subsequent picture, so as to generate a predicted block, and encodes differences between the predicted block and the current block. Here, a frame that is referred to in encoding or decoding the current picture (i.e., current frame) is called a reference frame.

At least one exemplary embodiment of the present disclosure relates to improving the performance of encoding and decoding, in case of partitioning a CU (Coding Unit) into one or more PUs (Prediction Units) and then predicting the partitioned PUs.

FIG. 1 is a diagram of an example of the coding unit abbreviated as CU. The CU is a basic unit for encoding and decoding and has the form of a quad tree. When inspected in detail, FIG. 1 illustrates the largest coding unit (LCU) of 64×64 set to depth 0, which is recursively encoded down to depth 3 where CU becomes the size of 8×8.

The CU is then partitioned into basic units for prediction defined as PU and the prediction for each of the partitioned PUs within the CU is performed.

Figure 2:
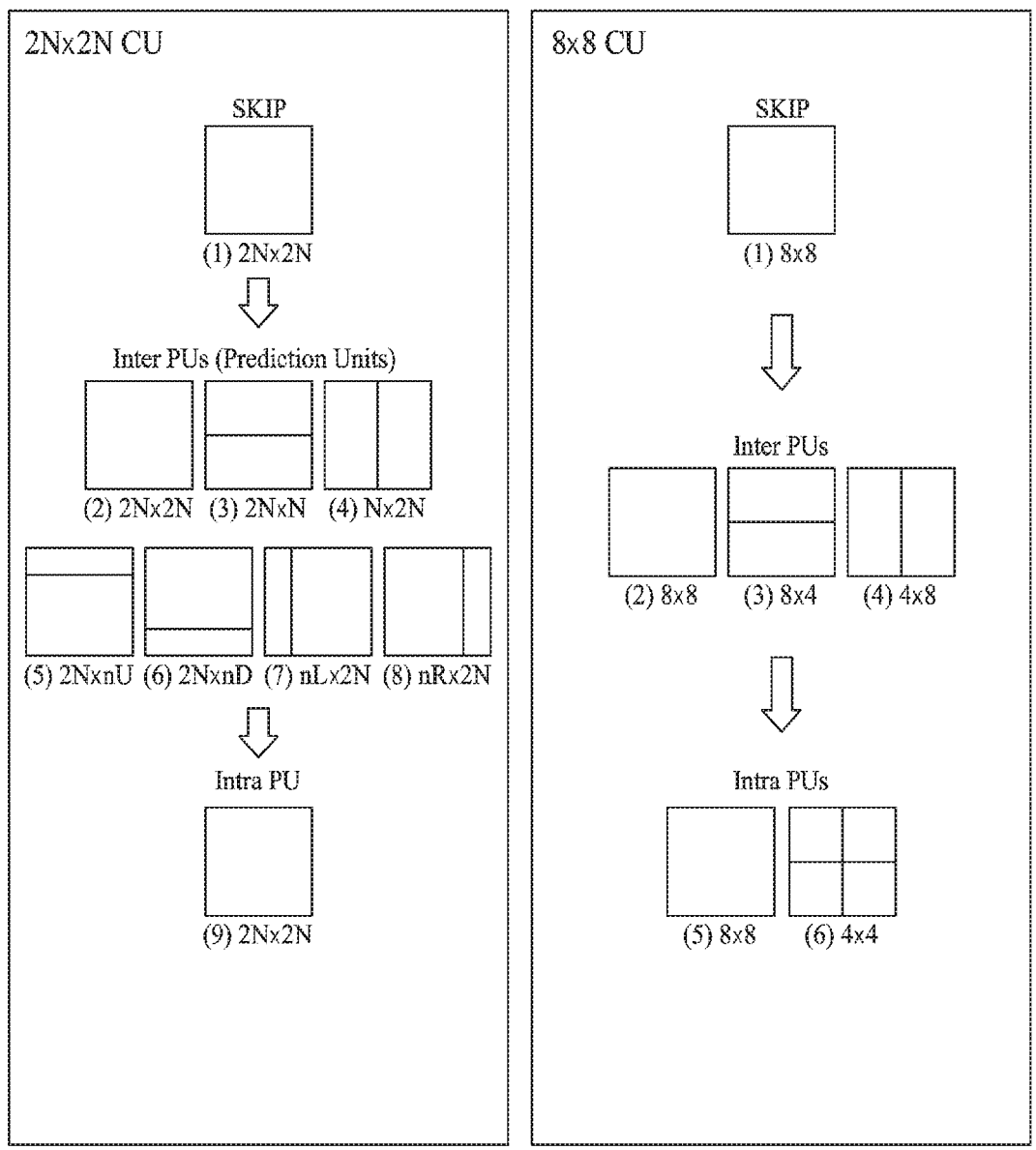
FIG. 2 is a diagram of the types of PUs and the prediction sequence of PUs in a CU.

FIG. 2 is a diagram of the types of PUs and the sequence of predictions of PUs within a single CU.

Referring to FIG. 2, in the CU of size 2N×2N, a prediction using a skip mode is carried out and followed by predictions performed based on the PUs of inter 2N×2N mode, inter 2N×N mode, inter N×2N mode, inter 2N×nU mode, inter 2N×nD mode, inter nL×2N mode, inter nR×2N mode, intra 2N×2N mode and intra N×N mode. However, in the CU of size 8×8, the predictions are performed based on the PUs of inter 2N×2N, inter 2N×N, inter N×2N, intra 2N×2N and intra N×N modes. In the 2N×nU, 2N×nD, nL×2N and nR×2N modes, n is ½ and the CU is partitioned into two asymmetric blocks. As shown in FIG. 2, in case of the 2N×nU or 2N×nD modes, the CU is partitioned into upper and lower blocks of which vertical lengths have a ratio of 1:3 or 3:1. In case of the nL×2N or nR×2N modes, the CU is partitioned into left and right blocks of which horizontal lengths have a ratio of 1:3 or 3:1.

The prediction method is classified into an intra predictive coding method for making a prediction by using a predicted value from an encoded block in the current frame under coding process and an inter predictive coding method for predicting the current block by estimating motion from the previously reconstructed frame.

The intra predictive method used is a unified intra prediction which performs multi-directional predictions by using the values of pixels at the left, lower left, upper left, upper and upper right sides of the previously encoded relevant block. In addition, the intra prediction predicts by the PU of the same size of 2N×2N as the CU or by the PU of N×N which is a quarter of the CU.

Figure 3:
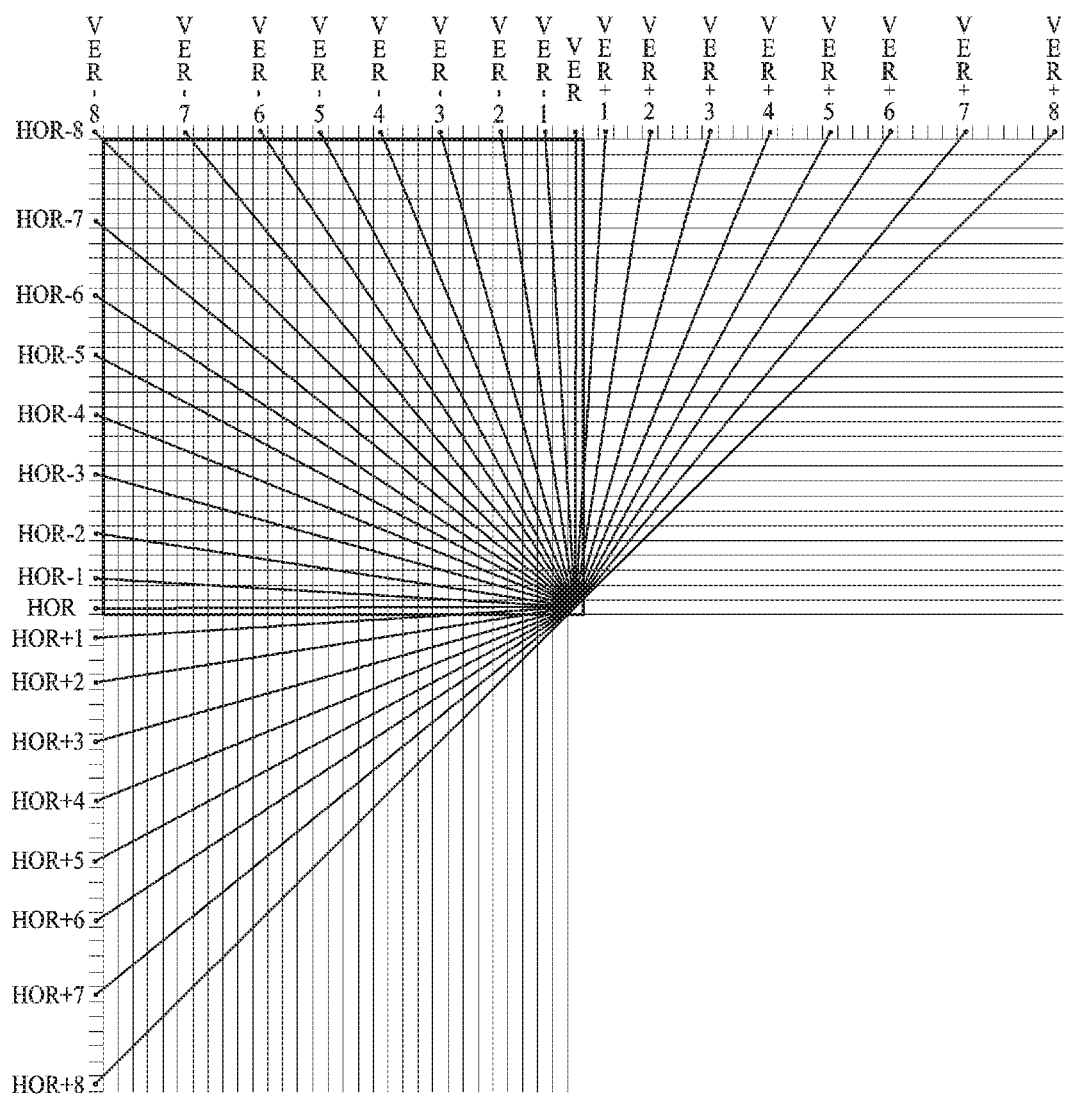
FIG. 3 is a diagram of the directions of intra-prediction modes.

FIG. 3 is a diagram of the directions of the intra prediction mode.

Referring to FIG. 3, a total of 35 different prediction modes are presented including DC (direct current) mode, a planar mode and 33 different predictively oriented angular modes.

The inter predictive coding method uses motion compensation which predicts the current block by a motion estimation from the previously coded frame. As a result of the motion compensation, motion information such as a motion vector of the current block, which is needed for subsequent decoding operation, is generated. The inter prediction is performed by the 2N×N mode of PUs partitioned as symmetrical and equal upper and lower blocks, or by the N×2N mode of PUs partitioned as symmetrical and equal left and right blocks. Also, the inter prediction is performed by 2N×nU, 2N×nD, nL×2N and nR×2N modes representing PUs partitioned asymmetrically to the upper and lower sides, or left and right sides.

After the motion vector of the current block is obtained, a motion vector error value is generated by calculating difference from a motion vector predicted by way of the motion vector prediction with neighboring PUs within the previously coded frame or the current frame. Alternatively, when the motion vector merging is involved to use, as the motion vector of the current block, the same motion vector as a PU within the previously coded frame or the current frame, a flag is generated to indicate that the motion vector of the current block is encoded by the motion vector merging.

Figure 4:
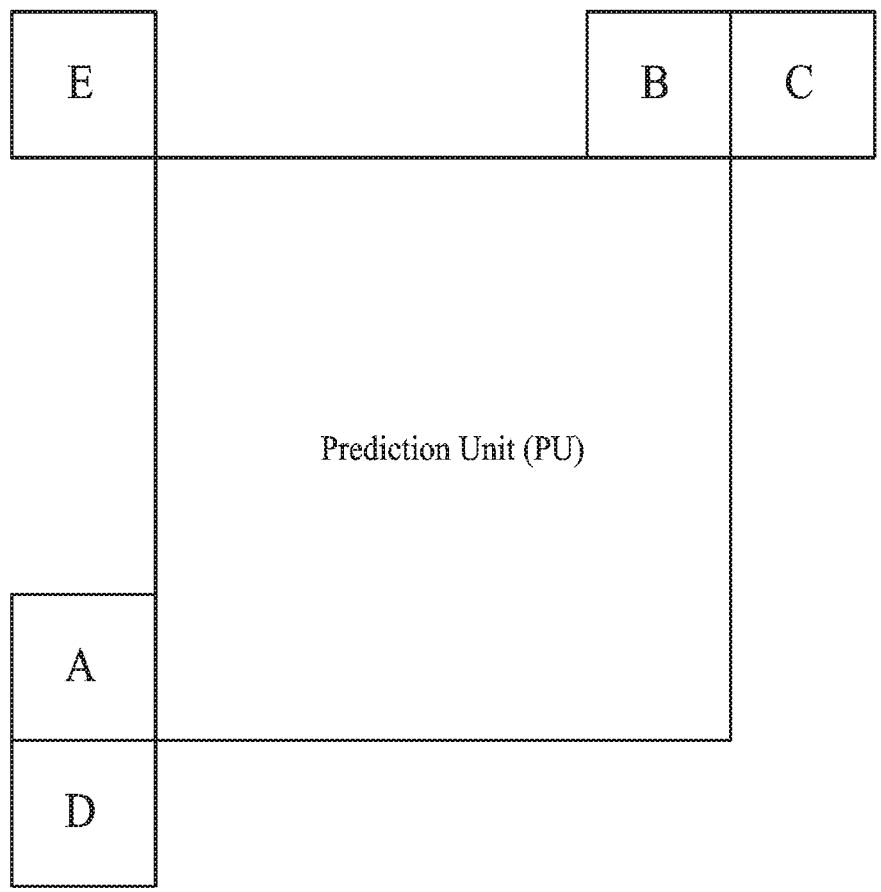
FIG. 4 is a diagram of locations of adjacent PUs, from which information for motion vector prediction can be obtained in the current frame.

FIG. 4 is a diagram of the positions (A~E) of adjacent PUs from which information for motion vector prediction can be obtained in the current frame.

When the inter prediction or intra prediction makes a predicted block, its predicted values are subtracted from the original pixel values of the current block to generate the difference as residual signals. Performing a frequency conversion on the residual signal provides a frequency conversion block which is then quantized to generate a block of quantized frequency coefficients. The basic unit of transform and quantization is called TU (transform unit). After preforming transform and quantization based on TU, the TU is scanned by a scanning method which depends on the specific conditions, and an entropy coding or other coding method is applied according to the scanning sequence to generate a bitstream.

Figure 5:
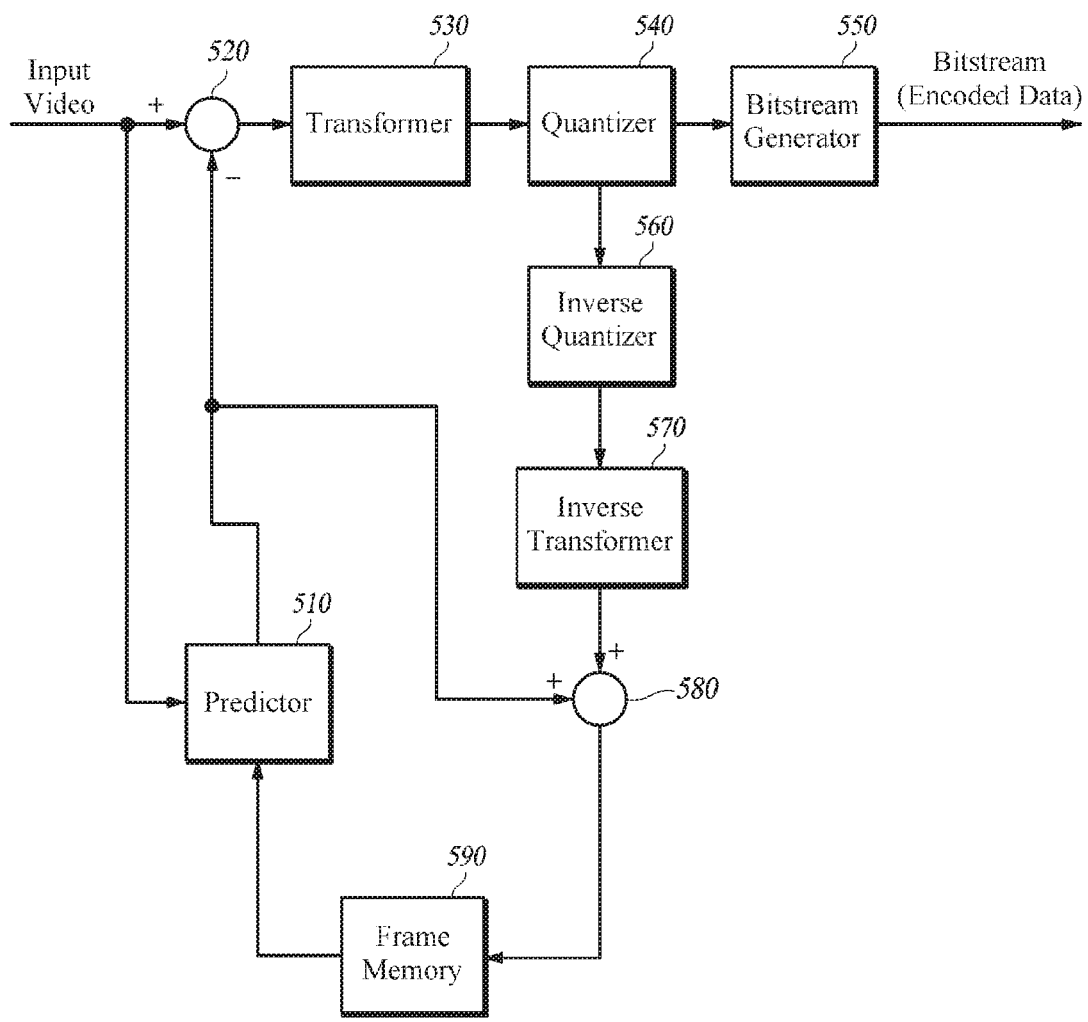
FIG. 5 is a schematic block diagram of a video encoding apparatus according to at least one exemplary embodiment of the present disclosure.

FIG. 5 is a schematic block diagram of a video encoding apparatus according to at least one exemplary embodiment of the present disclosure.

The video encoding apparatus 500 is adapted to subdivide the CU into fine PUs and predict the PUs, and it comprises a predictor 510, a subtractor 520, a transformer 530, a quantizer 540 and a bitstream generator 550 as illustrated in FIG. 5. All or some components of the video encoding apparatus 500, such as the predictor 510, the subtractor 520, the transformer 530, the quantizer 540 and the bitstream generator 550 are implemented by one or more processors and/or application-specific integrated circuits (ASICs).

The input video to be encoded is input by the unit of CU which is formed as an N×N block wherein N has the size of $2^n$. The CUs are made in the form of a quad tree on which divisions and encodings of CUs are recursively performed from the largest CU to a specified depth.

Predictions are performed by each prediction unit PU within a CU, wherein the PU is in the form of an N×M block. The PUs include a plurality of inter PUs and intra PUs. Video encoding apparatus 500 performs the encoding for each PU of all PU modes, and then a PU mode with the best compression efficiency is determined as the PU mode of the CU. Upon completion of the predictions for each of the PUs, the CU is divided into transform unit TUs. The TU and PU are irrelevant in size and the TU is greater or smaller than the PU. The TUs are quantized and transformed and then entropy coding or other coding methods are used for encoding information on the determined PU mode. At this time, the reference of compression efficiency is determined by using a rate distortion cost which includes the number of bits required for transmission of video information and the value of the difference between the original block and the predicted block.

In order to predict the PUs in the current CU, predictor 510 generates a predicted block of the current PU to be encoded by using other frames or by using pixel values of previously encoded pixels in the left, lower left, upper left, upper, upper right of the current CU within the current frame. In other words, in the intra prediction mode, predictor 510 determines the prediction mode by using information on the left, lower left, upper left, upper, upper right CU reconstructed after an encoding process and uses the determined prediction mode to generate the predicted block. Whereas, in the inter prediction mode, predictor 510 generates motion vectors through motion estimation from the previous frame reconstructed after an encoding process and generates the predicted block of the current PU by carrying out a motion compensation using the generated motion vectors. Predictor 510 performs prediction by both inter prediction method and intra prediction method. Description will be provided later on using the improved PU mode according to some embodiments of the present disclosure for generating a predicted block from the current CU by way of partitioning the CU into fine PUs.

Subtractor 520 generates a residual signal by calculating the difference between the original pixel values of the current block and the predicted values of the predicted block generated by predictor 510.

Transformer 530 transforms the residual signal generated by subtractor 520 into the frequency domain. Transformer 530 divides the residual signals of the current CU into TUs and performs the transform for each of the TUs. The TUs are of N×N block type or N×M block type where N and M are integers different from each other. After the predictions have been performed for all PUs within the current CU by the predictor 510, the transformer 530 recursively transforms each TU. The TUs are sized smaller than or equal to the corresponding current CU but irrelevant to the sizes of the PUs. As with CUs, the TUs are in the form of a quad tree. Transforms of TUs are recursively performed from the size of the CU to a specified depth. At this time, a split transform flag for each depth of TU is transmitted to a video decoding device to be described later, whereby transmitting information on the size of TU having the lowest rate distortion (RD) cost. Here, transformer 530 can generate one or more transform blocks by transforming the residual signals of each TU into the frequency domain by using discrete cosine transform (DCT), wavelet transform or a variety of other transform techniques that transform image signals on the time axis to those on the frequency axis.

Quantizer 540 quantizes one or more transform blocks composed of the frequency domain residual signals after the transform by transformer 530. Quantizer 540 uses dead zone uniform threshold quantization (hereinafter called DZUTQ), quantization weighted matrix or other various quantization techniques.

Bitstream generator 550 generates a bitstream by encoding information on the quantized transform blocks composed of frequency coefficients after the quantization by quantizer 540, intra prediction mode, motion vector and PU mode information indicating by which type the CU is finely split into PUs, and the like. The encoding schemes used varys and includes, but not limited to, an entropy encoding scheme.

Inverse quantizer 560 performs an inverse quantization on the transformed and quantized residual blocks (i.e., the quantized transform blocks), and inverse transformer 570 performs an inverse transform on the dequantized transform blocks to reconstruct the residual block of the current CU. Herein, the inverse transform and inverse quantization are performed by performing in reverse each of the transform process by transformer 530 and the quantization performed by quantizer 540. Inverse quantization unit 560 and inverse transformer 570 use the transform and quantization information (e.g., information on transform and quantization types) generated by and delivered from transformer 530 and quantizer 540.

Adder 580 adds the predicted block from predictor 510 and the residual block from transform unit 570 to generate a reconstructed block.

Frame memory 590 stores the reconstructed block from adder 580 for use as a reference block for generating a predicted block in the subsequent process of intra or inter prediction.

A following process is performed for generating a predicted block by using the improved mode of prediction units in accordance with at least one embodiment of the present disclosure.

To make predictions in predictor 510, the CU is supposed to be divided into particular forms of PUs, wherein the finely split PUs are provided.

Figure 7:
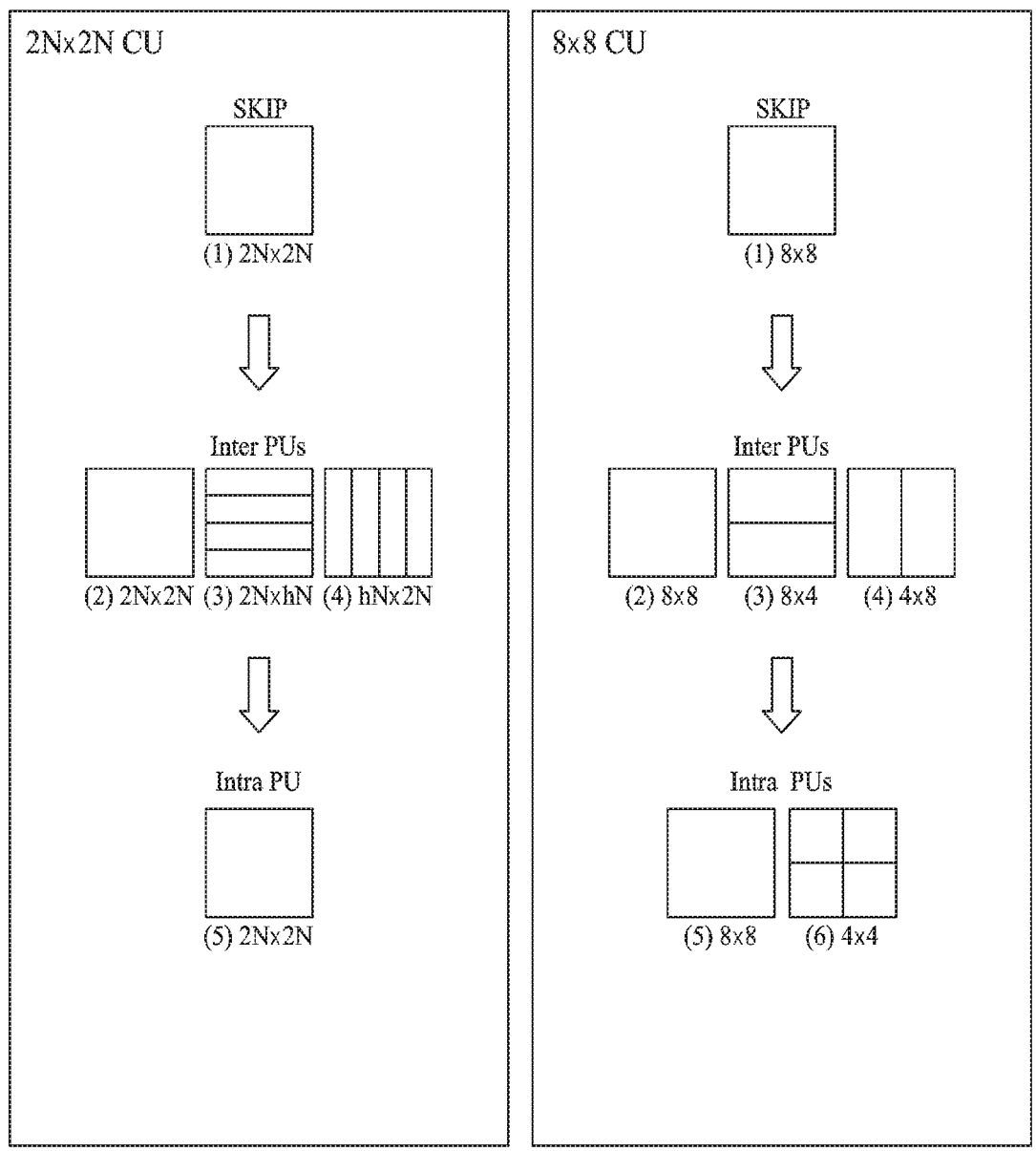
FIG. 7 is a diagram of exemplary types of prediction units encoded in a CU and a prediction sequence of the PUs according to at least one exemplary embodiment of the present disclosure.

FIG. 7 is a diagram of exemplary types of encodable PUs and a prediction sequence when encoding a CU including finely split PUs.

FIG. 7 illustrates a single CU with splits of PUs into 2N×hN PUs (where h=½) each having horizontal length four times the vertical length and hN×2N PUs each having vertical length four times the horizontal length. If the size of CU is 16×16, a single PU is 16×4 or 4×16.

Predictor 510 searches for the predicted block that is most similar to the pixel values of the original pixels in the PUs of the determined sizes as above, from within the reference frame stored in frame memory 590 without departing from a set search range of the reference frame by way of search methods including, but not limited to, full search method and diamond search.

The following Equation 1 illustrates an exemplary equation used for finding the closest predicted block to the values of the original pixels in the reference block.

$$SAD = \sum_{i=1}^{N} \sum_{j=1}^{M} |c_{i,j} - r_{i,j}| \qquad \text{Equation 1}$$

In Equation 1, $c_{i,j}$ means the original pixel value of a PU and $r_{i,j}$ means the predicted pixel value of the predicted block. Therefore, SAD means the sum of differences between the original pixel values in the PU and the pixel values in the predicted block. Predictor 510 searches for the block having the minimum SAD in the reference frame within its search range.

Once the optimal predicted block is searched from within the reference frame, a motion vector is produced corresponding to the displacement of each of the horizontal and vertical axes between predicted block in the reference frame and the PU in the current frame. To reduce the amount of bitstream used to transmit such generated motion vector to the video decoding apparatus, the motion vector prediction technology based on Equation 2 below is used, although the motion vector prediction is not limited thereto but includes other similar methods.

$$mvd = mv - mvp \qquad \text{Equation 2}$$

In Equation 2, mv means a motion vector representing the position of the predicted block searched from the reference frame and mvp corresponds to the predicted motion vector predicted from the current frame or the reference frame. mvp represents the closest motion vector to the current block motion vector among the motion vectors obtained from the adjacent PUs within the current frame or the adjacent PU or PUs within the reference frame, although the closest motion vector is obtained otherwise. Further, mvd represents the motion vector error (differential motion vector) to be transmitted to the video decoding apparatus.

FIG. 4 shows the possible locations by the adjacent PU in the current frame to determine mvp. The possible locations to determine mvp is not limited to those presented in FIG. 4 as it is illustrative only. For example, the collocated PU in the previous frame is further included. The adjacent PU as expressed in this embodiment includes not only the spatially adjacent PU but also the temporally adjacent PU like the collocated PU in the previous frame.

A method performed by predictor 510 for obtaining the motion information of PU is to use the motion information such as motion vector and reference index of the adjacent PU as the current block motion information, which is referred to as motion information merge. Some embodiments utilizes the merging method in generating the predicted block, though other various unrestricted prediction methods are used.

In case of using the motion information merge method, the motion information of the current PU is determined by using motion information of adjacent PUs (A~E) in the current frame as illustrated in FIG. 4. Various other adjacent PUs are available without limitation to the example as shown in FIG. 4.

Figure 8:
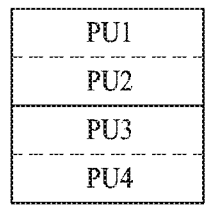
FIG. 8 is a diagram of a motion information merging process applied to the PUs shown in FIG. 7 providing the similar effect as the PUs shown in FIG. 2.
Figure 8:
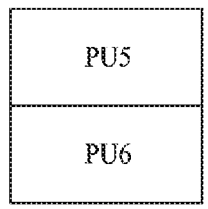
Figure 8:
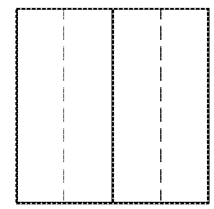
Figure 8:
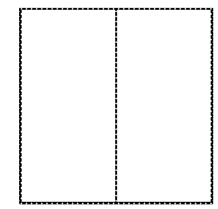
Figure 8:
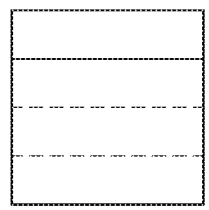
Figure 8:
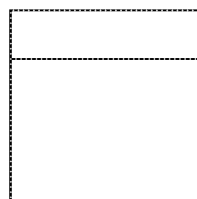
Figure 8:
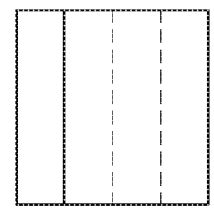
Figure 8:
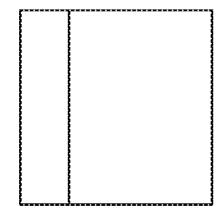
Figure 8:
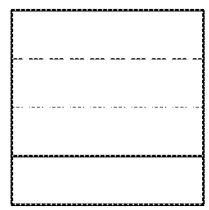
Figure 8:
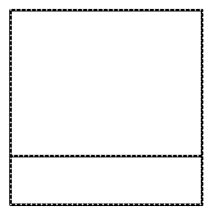
Figure 8:
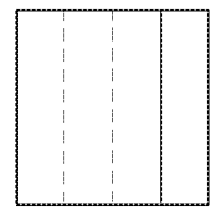
Figure 8:
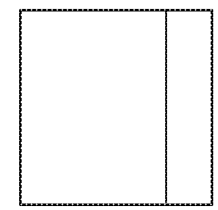

FIG. 8 illustrates the motion information merging process applied to the PUs shown in FIG. 7 to offer the comparable effect as with the PUs in FIG. 2.

An exemplary case applying the motion information merging process will be described below. In the exemplary case, the CU of size 2N×2N is partitioned into PUs with each sized 2N×hN as shown in (3) of FIG. 7.

When the partitioning of the CU is into PUs of 2N×hN, the CU of 2N×2N is partitioned into four 2N×hN (h=½) sized PU1, PU2, PU3 and PU4, as shown in FIG. 8. In case when predictor 510 predicts PU1 and acquire motion information of the current PU (i.e. PU1), bitstream generator 550 checks whether motion information of the adjacent CU's prediction unit (PU) is equal to that of the current PU (PU1) in order to encode the motion information of the current PU.

If the current PU and the adjacent CU's prediction unit (PU) have the same motion information, bitstream generator 550 encodes a merge flag for indicating merging of the current PU motion information and a merge index representing the adjacent block used for the merging. Here, candidate adjacent blocks to be selected for use in merging PU1 are PUs located within the adjacent CUs (corresponding to A, B, C, D and E) as in FIG. 4. It should be understood that different embodiments of the present disclosure have different locations of the adjacent CUs from A, B, C, D and E.

However, candidate adjacent blocks to be selected for use in merging PU2 are not the PUs located at the adjacent CUs (corresponding to A, B, C, D and E), which is different from FIG. 4. In order to merge PU2, adjacent blocks to be considered exclude CU 'B' from the adjacent CUs shown in FIG. 11 but include PU1 instead. In other words, PU1 and CUs 'A, C, D and E' are considered to determine whether to merge PU2. Hence, if it is desired to merge a current PU within current CU, candidates for use in merging includes not only PUs in the adjacent CUs but also a PU or PUs adjacent to the current PU within the current CU to be encoded. Similarly, to merge PU 3, adjacent blocks to be considered include PU 2 and PUs of the adjacent CUs 'A, C, D, E'. The locations of the adjacent CUs 'A, C, D, E' described as to be considered to merge PU 3 for illustrative purpose are not limited to what is shown in FIG. 11 but PUs at other various locations are candidates to consider for merging PU3.

In this way, by incorporating the motion information of other PUs in the current CU including the current PU as candidates for the motion information merge, the CU is predicted more precisely while effecting the same predictive encoding as with PUs of 2N×nU and 2N×nD.

Figure 11:
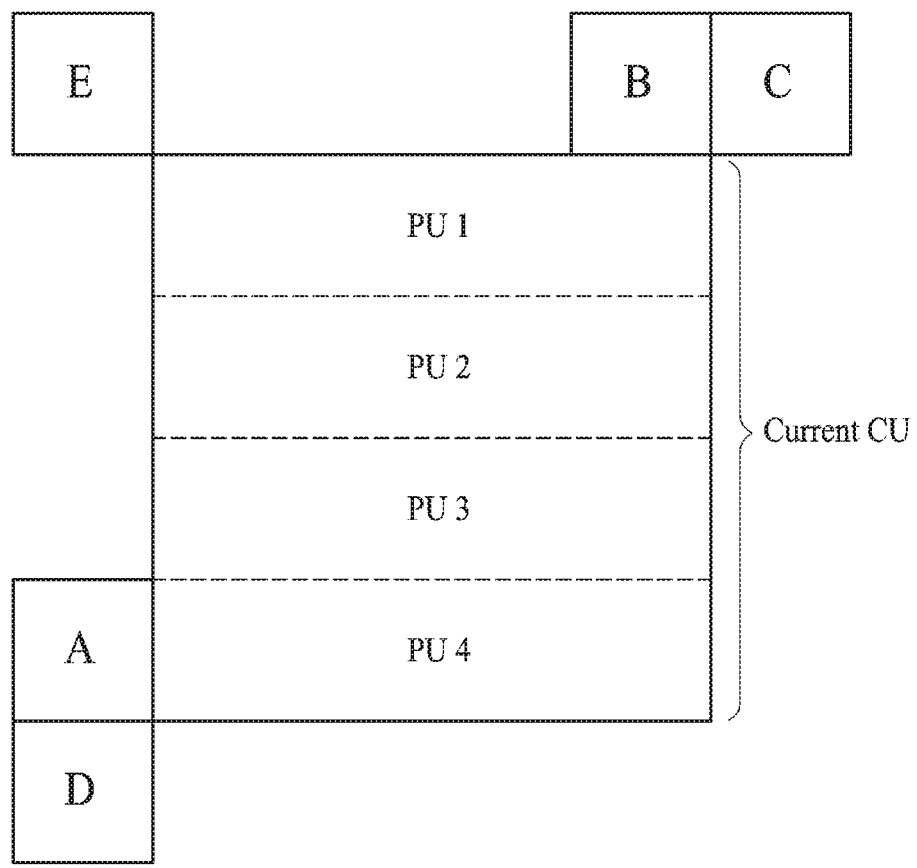
FIG. 11 is a diagram of PU partitions of the current CU and the locations of adjacent CUs available for use in motion information merge for each PU.

For example, when the PU1 through PU4 in FIG. 11 are sequentially verified for their availabilities for motion information merge, if PUs 1, 2 and 3 have the same motion information appropriate for merge, the PUs 1, 2 and 3 are encoded in effect with their motion information merged into one, whereby approximating the predictive encoding of the PU of 2N×nD. Likewise, if PUs 2, 3 and 4 have the same motion information entitled to be merged, they are eventually encoded with a single piece of merged motion information, whereby approximating the predictive encoding of the PU of 2N×nU.

This effect of merged encoding is similarly applicable to a CU partitioned into PUs of hN×2N besides the split PUs of 2N×hN. Various exemplary effects of such motion information merge performed are illustrated in FIG. 8.

Dotted lines in FIG. 8 represent the motion information in merge. According to FIG. 8, by using the motion information merge, the PUs of 2N×hN in FIG. 7 bring similar effects of encoding of the 2N×N, 2N×nU and 2N×nD PUs in FIG. 2, while the hN×2N PUs in FIG. 7 provide, through the motion information merge, similar effects of encoding of the N×2N, nL×2N and nR×2N PUs in FIG. 2. For example, in case of doing predictions with the 2N×hN PUs in FIG. 8, when PU1 is first encoded and encoding of PU2 is performed with motion information of PU1 merged, PU1 and PU2 are encoded with an accompanied overhead of insignificant difference from encoding PU5, that is, encoding the 2N×N PU.

The encoding of the CU by finer PU modes, if the motion information merge is applicable, has effectiveness similar to the encoding of the CU by a various shapes of PUs, providing the benefit of having a plurality of PU modes.

If the CU has the hN×2N PUs in the prediction process, each PU undergoes the prediction to the total of four prediction sessions for the single CU. Upon completion of the four prediction sessions, the encoding proceeds through subtractor 520, transformer 530, quantizer 540, inverse quantizer 560 and inverse transformer 570.

In order to compare the coding performances of the respective 2N×2N, 2N×hN and other PU modes specified in FIG. 7, the resulting values are compared by using Equation 3.

$$RDcost = Distortion + \lambda \times Rates \qquad \text{Equation 3}$$

In Equation 3, Distortion is a value indicating the difference between the original pixel value and the predicted value generated by predictor 510, and the Distortion value for use is SAD in Equation 1 or it is generated by different methods for presenting the error value, without limitation to the above mentioned method. Rates represents the total number of bits of the current block encoded after going through predictor 510, transformer 530 and quantizer 540, and λ represents Lagrange coefficients. Low RDcost means high coding performance. In other words, an optimum PU mode herein such PU mode that has the lowest difference between the original pixel value and the predicted pixel value and has the lowest bit rate after all the coding processes by predictor 510 through quantizer 540.

Predictor 510 performs a prediction by each PU which is equal to or partitioned finer than 2N×2N CU. Here, the finely partitioned PUs are shaped into four 2N×hN PUs where h is ½. However, h is also set to different values to provide more or less PU partitions than four. h is a fractional number smaller than 1. For example, 'h' is ½, ⅓ and ¼ among others.

In encoding the respective PUs split from a single CU, predictor 510 makes the respective predicted blocks of the PUs. A full search method or diamond search method is used for searching for the predicted blocks from the reference frame. However, search methods are not limited to them. For the sake of effective encoding of motion vectors upon completion of the predicted block search, a motion vector prediction is used. As described above, the motion vector prediction method comprises finding, among the adjacent PUs in the current frame or PUs in the reference frame, the motion vector prediction value with the least motion vector error from the current block motion vector, or any other effective methods or skipped motion vector prediction.

Description has been provided on the method for merging motion information (including motion vector and reference picture index) of the current block (current PU) with motion information of a PU adjacent to the current PU and with the PU motion information of the current block, and the detailed explanation will not be repeated. This fine PU partitioning reduces distortions, and the accordingly increased amount of motion information to transmit to the video decoding apparatus is offset under appropriate conditions by the motion information merge, whereby improving the resultant performance of the video encoding apparatus.

On the other hand, for the inter-prediction, predictor 510 makes block partitions as shown in FIG. 2 or 7.

As shown in FIG. 8, predictor 510 sets value 'h' to let the hN×2N or 2N×hN split PU mode have partition boundaries including those of 2N×N, 2N×nU, 2N×nD, N×2N, nL×2N and nR×2N PU modes where n is ½. In this case, 'h' is set to ½k (k: positive integer) such as ½ and ¼ and the like.

In addition, predictor 510 sets value 'h' so that the PU mode has partition boundaries excluding those of 2N×N, 2N×nU, 2N×nD, N×2N, nL×2N and nR×2N PU modes where n is ½. In this case, 'h' is set to 2/(2 k+1) where k is positive integer. For example, 'h' is ⅔, ⅖ and the like. Further, 'h' is set so that the PU mode has partition boundaries including some partition boundaries of 2N×N, 2N×nU, 2N×nD, N×2N, nL×2N, nR×2N PU modes and excluding other partition boundaries thereof.

In addition, predictor 510 outputs the CU of 2N×2N as is, or perform exclusively to 2N×hN or hN×2N PU modes and skip the other PU modes. For example, this means not to make partitions into 2N×N, 2N×nU, 2N×nD, N×2N, nL×2n and nR×2N PU modes. Therefore, in this case, the video encoding apparatus 500 performs encoding by using only 2N×2N, 2N×hN and hN×2N PU modes among the entire inter prediction modes.

Predictor 510 also uses PU modes by partitioning of the CU into 2N×hN or hN×2N or into 2N×N, 2N×nU, 2N×nD, N×2N, nL×2n and nR×2N, and in some cases, omit asymmetrically partitioned PU modes. For example, the encoding by 2N×nU, 2N×nD, nL×2N, nR×2N modes, etc., is omitted in order to reduce overhead accompanied by the encoding.

Predictor 510 skips a part of the subsequent inter predictive encoding depending on the result of the previous inter predictive encoding. For example, predictor 510 is responsive to inter predictive encoding performances with 2N×2N, 2N×N and N×2N modes, and omits encoding of the PUs of size hN×2N if the 2N×N mode provides the best of the encoding performances. Predictor 510 omits encoding of the PUs of size 2N×hN if the N×2N mode provides the best of the inter predictive encoding performances.

Additionally, when performing an inter prediction mode encoding, predictor 510 skips encoding by the motion compensation during the subsequent inter predictive encoding depending on the result of the previous inter predictive encoding. In this case, encoding by the motion information merge is carried out. For example, predictor 510 is responsive to encoding performances with 2N×2N, 2N×N and N×2N modes and omits encoding by motion compensation and instead perform encoding by exclusively using a motion vector merge if the 2N×N mode provides the best of the encoding performances.

Figure 6:
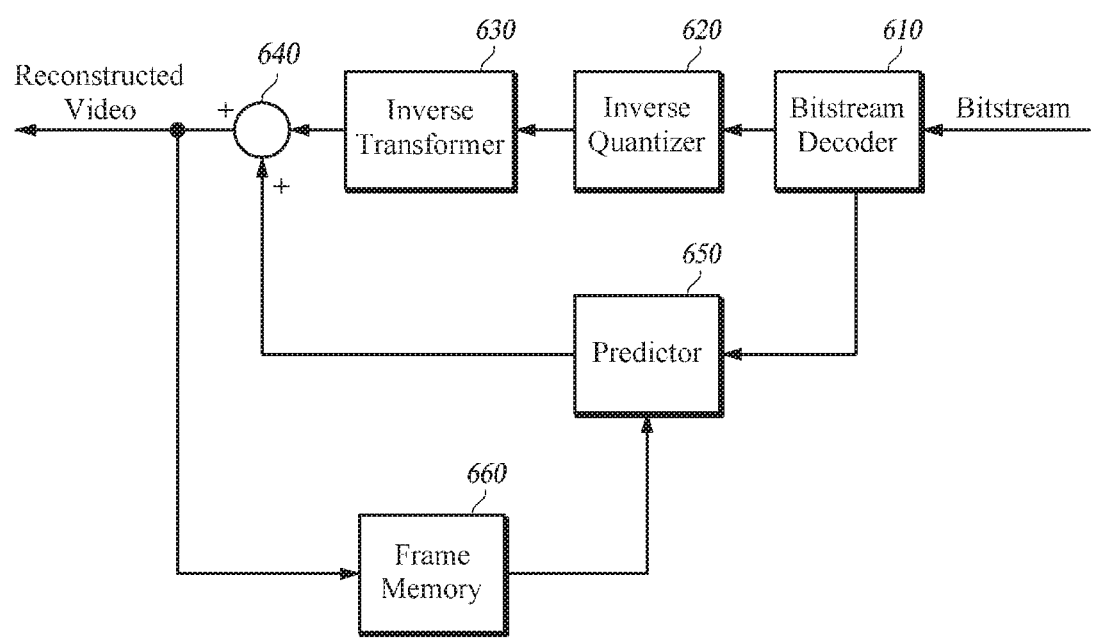
FIG. 6 is a schematic block diagram of a video decoding apparatus according to at least one exemplary embodiment of the present disclosure.

FIG. 6 is a block diagram showing a configuration of a video decoding apparatus according to an exemplary embodiment of the present disclosure.

As shown in FIG. 6, video decoding apparatus 600 is adapted to decode, from a bitstream, information on the PU mode that have been determined by the video encoding apparatus and then performs a predictive decoding on the decoded information. Video decoding apparatus 600 comprises a bitstream decoder 610, an inverse quantizer 620, an inverse transformer 630, an adder 640 and a predictor 650. All or some components of the video decoding apparatus 600, such as the bitstream decoder 610, the inverse quantizer 620, the inverse transformer 630, the adder 640, and the predictor 650 are implemented by one or more processors and/or application-specific integrated circuits (ASICs).

Bitstream decoder 610 extracts quantized transform blocks by decoding a bitstream.

Besides extraction of the quantized transform blocks from the encoded data, bitstream decoder 610 decodes or extracts various information required for the decoding operation. Here, the required information means information needed for decoding encoded bit string within encoded data (i.e., bitstream), such as block type information, motion vector information, transform and quantization type information and other various information.

Bitstream decoder 610, by decoding the bitstream that has been encoded by video encoding apparatus 500, extracts prediction information including PU mode information, and transmits the extracted prediction information to predictor 650. For example, if video encoding apparatus 500 performed prediction on a predetermined CU by using 2N×hN or hN×2N (where, h=½, ⅓, ...) splits of PUs, the PU mode information indicating the partitioning of the CU into 2N×hN or hN×2N PUs is extracted from the bitstream by bitstream decoder 610.

the value of 'h', as illustrated in FIG. 8, is set so that the 2N×hN or hN×2N split PU mode have their partition boundaries include the partition boundaries of PU modes of 2N×N, 2N×nU, 2N×nD, N×2N, nL×2N and nR×2N where n is ½. In this case, 'h' is set to ½k (k: positive integer) such as ½ and ¼ and the like.

In addition, the value of 'h' is set so that the partition boundaries of the PUs do not include the partition boundaries of PU modes of 2N×N, 2N×nU, 2N×nD, N×2N, nL×2N and nR×2N where n is ½ .... In this case, 'h' is set to 2/(2 k+1) where k is positive integer. Further, 'h' is set so that the PU mode has partition boundaries including some partition boundaries of 2N×N, 2N×nU, 2N×nD, N×2N, nL×2N, nR×2N PU modes and excluding other partition boundaries thereof.

Additionally, bitstream decoder 610 extracts, from the bitstream, a merge flag for each PU and a merge index if the extracted merge flag indicates that the current PU have its motion information encoded through merge (indicates merge mode).

Predictor 650 uses the required information for prediction delivered from bitstream decoder 610 to predict the current CU in the same manner as in predictor 510 of video encoding apparatus 500.

Predictor 650 generates the predicted value of the current CU through decoding based on information corresponding to one of inter prediction and intra prediction methods. Predictor 650 receives, via bitstream decoder 610, information on the predictive encoding scheme determined in predictor 510 and generates the predicted values for each 2N×hN or hN×2N split PU pursuant to the information on the predictive encoding scheme.

In response to the current PU having its motion information encoded through merge, predictor 650 identifies motion information of an adjacent PU corresponding to the value of merge index extracted from the bitstream so as to reconstruct the motion information of the current PU.

As explained in the description of the video encoding apparatus, the merge index indicates which of the adjacent PUs within the current PU to be reconstructed were used to merge the motion information of the current PU.

For example, with a CU partitioned into PUs as shown in FIG. 11, the candidate adjacent blocks to be considered for identifying the merge index of PU1 are PUs respectively located within adjacent CUs A, B, C, D and E. In addition, the candidate adjacent blocks to be considered for identifying the merge index of PU2 are PU1 and PUs within CUs A, C, D and E; the candidate adjacent blocks for PU3 are PU2 and PUs within CUs A, C, D and E; and the candidate adjacent blocks for PU4 are PU3 and CUs A, C, D and E. As described above, CUs A, C, D and E to be considered for the merge index identification are not restricted to the illustrated locations in FIG. 11. Rather, PUs in other various CUs are considered as candidate PUs for identifying merge indexes for PU2, PU3 and PU4.

To generate the predicted block of the current CU, predictor 650 of video decoding apparatus 600 according to at least one embodiment of the present disclosure operates similar to predictor 510 of video encoding apparatus 500. In other words, in case of inter prediction, predictor 650 uses information delivered from bitstream decoder 610 including motion information and PU mode information to generate the predicted block. In case of intra prediction, it receives information to intra mode delivered from bitstream decoder 610 to generate the predicted block. In another case of skip mode, predictor 650 generates the predicted block through motion compensation by using only motion information. In further case of merge mode, predictor 650 generates the predicted block by using motion information reconstructed based on the merge index delivered from bitstream decoder 610.

Inverse quantizer 620 inversely quantizes the quantized transform blocks extracted from the bitstream by bitstream decoder 610 to generate transform blocks. The inverse quantization is performed by reversing the procedure of quantization that was performed by quantizer 540. This is the same as the method for varying the size of quantization depending on the scanning, the description of which is not repeated here to avoid redundancy.

Inverse transformer 630 inversely transforms the generated transform blocks to the time domain to reconstruct a residual block of the current CU. Therefore, the inverse transform is performed by reversing the transform procedure performed by transformer 530.

Adder 640 reconstructs the original pixel values of the current CU by adding residual signals of the reconstructed residual block and the predicted pixel values of the predicted block generated by predictor 650.

The reconstructed current block is transferred to a frame memory 660 and used by predictor 650 later for predicting another block.

Frame memory 660 stores reconstructed images to enable the generation of intra predicted blocks and inter predicted block.

An apparatus for encoding/decoding images is implemented according to at least one embodiment of the present disclosure, by comprising video encoding apparatus 500 as a video encoder unit and video decoding apparatus 600 as a video encoder unit. Video encoding apparatus 500 is adapted to perform a coding of the images by coding unit (CU) by partitioning the CU into prediction units (PUs) of size 2N×hN or hN×2N (where h=½, ⅓, ...) and perform an intra prediction or an inter prediction based on the PUs to generate a predicted block. Video decoding apparatus 600 is adapted to extract from the bitstream, information on the PUs to reconstruct the current block.

Figure 9:
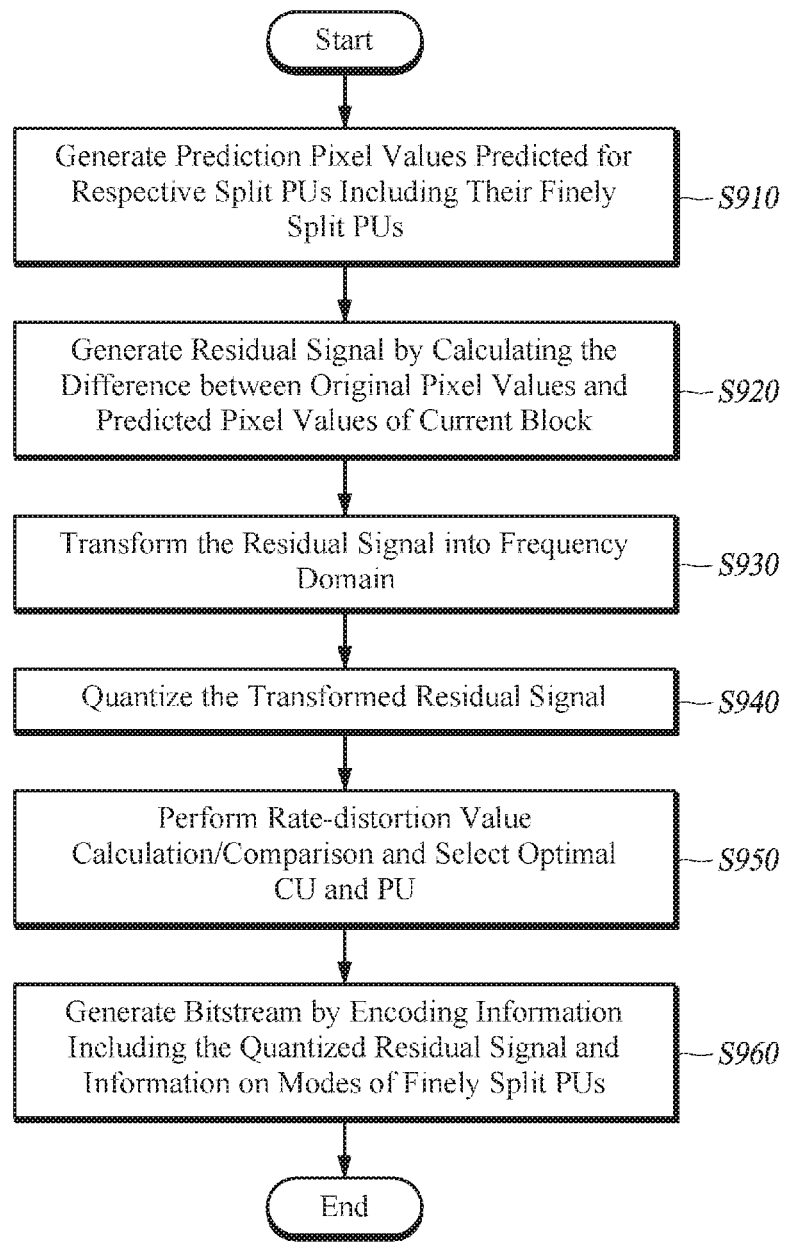
FIG. 9 is a flowchart of a video encoding method according to at least one exemplary embodiment of the present disclosure.

FIG. 9 is a flowchart of a video encoding method according to an exemplary embodiment of the present disclosure.

In the video encoding method, video encoding apparatus 500 performs a prediction step S910, a subtraction step S920, a transform step S930, a quantization step S940 and an encoding step S960. Prediction step S910 generates predicted pixel values for each PU finely split or split otherwise from the current CU. Subtraction step S920 subtracts the predicted pixel value from the original pixel value of the current CU to generate residual signals. Transform step S930 transforms the generated residual signals into frequency domain by using, for example, DCT transform or wavelet transform. Quantization step S940 quantizes the transformed residual signals. Encoding step S960 encodes the quantized transformed residual signals and information including finely split PU mode information into bitstreams.

Here, prediction step S910 corresponds in operation to predictor 510, subtraction step S920 to subtractor 520, transform step S930 to transformer 530, quantization step S940 to quantizer 540 and encoding step S950 to bitstream generator 550, and detailed descriptions thereof will be omitted.

Figure 10:
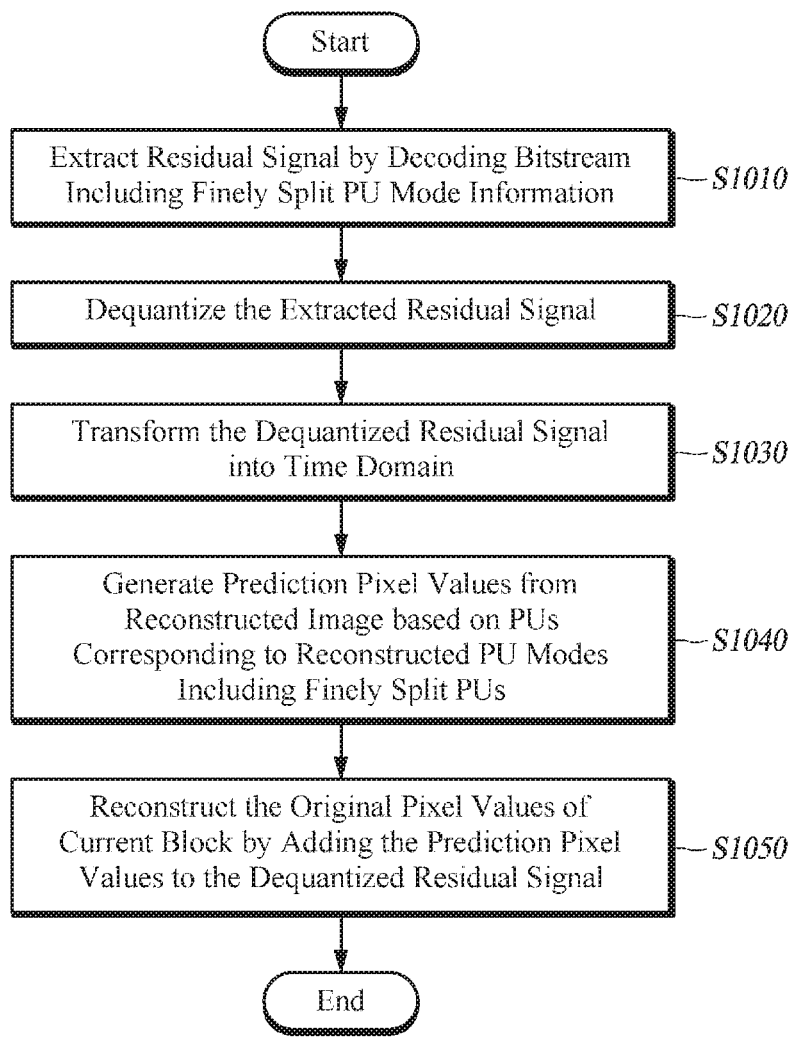
FIG. 10 is a flowchart of a video decoding method according to at least one exemplary embodiment of the present disclosure.

FIG. 10 is a flowchart of a video decoding method according to an exemplary embodiment of the present disclosure.

Video decoding apparatus 600 receives and stores the bitstream of image via wired or wireless networks, cables or other medium to reconstruct the video according to an algorithm of a user's choice or of a running program. Video decoding apparatus 600 decodes the bitstream and generates predicted pixel values of the current CU based on PUs corresponding to the PU mode information reconstructed from the bitstream. The PU mode information includes PU modes indicating finely split PUs. Video decoding apparatus 600 generates residual signals by inversely quantizing and then inversely transforming quantized transform residual signals reconstructed from the bitstream, and adds the generated residual signals to the predicted pixel values in order to reconstruct the image with the original pixel values.

To this end, video decoding apparatus 600 performs a decoding step S1010, an inverse quantization step S1020, an inverse transform step S1030, a prediction step S1040 and an addition step S1050. Decoding step S1010 decodes the bitstream to extract quantized transform residual signals and mode information including finely split PU modes. Inverse quantization step S1020 dequantizes the quantized transform residual signals. Inverse transform step S1030 transforms the transform residual signals back to the time domain. Prediction step S1040 generates predicted pixel values based on PUs corresponding to the PU mode reconstructed from the bitstream. Addition step S1050 reconstruct the original pixel value of the current CU by adding the respectively predicted pixel values of the current CU in step S1030 to the reconstructed residual signals of the current CU in step S1040.

Here, decoding step S1010 corresponds in operation to bitstream decoder 610, inverse quantization step S1020 to inverse quantizer 620, inverse transform step S1030 to inverse transformer 630, prediction step S1040 to predictor 650 and addition step S1050 to adder 640, and detailed descriptions thereof will be omitted.

A video encoding/decoding method according to an embodiment of the present disclosure is implemented with a video encoding method and a video decoding method combined according to some embodiments of the present disclosure.

According to an embodiment of the present disclosure, the video encoding/decoding method comprises encoding images and decoding images. The encoding of the images comprises encoding the images by coding unit (CU) by partitioning the CU into fine prediction units (PUs); performing an intra prediction or an inter prediction based on the PUs to generate a predicted block; subtracting the predicted block from the current block to generate a residual block; transforming the residual block to generate one or more transform blocks; quantizing the transform blocks to generate quantized transform blocks; and encoding the quantized transform blocks and information on the PU mode relating to the finely partitioned PUs into a bitstream. The decoding of the images comprises decoding quantized transform blocks from a bitstream and extracting information on the PU mode; inversely quantizing the quantized transform blocks to generate transform blocks; inversely transforming the transform blocks after the inversely quantizing to reconstruct a residual block of the current CU; generating a predicted block of the current CU by inter prediction or intra prediction, based on the information on the PU mode; and an adder configured to add the residual block and the generated predicted block to reconstruct the current CU.

Here, the encoding of the images is implemented by the video encoding method according to at least one embodiment of the present disclosure and the decoding of the images is implemented by the video decoding method according to at least one embodiment of the present disclosure.

In the description above, although all of the components of the embodiments of the present disclosure have been explained as assembled or operatively connected as a unit, one of ordinary skill would understand the present disclosure is not limited to such embodiments. Rather, within some embodiments of the present disclosure, the respective components are selectively and operatively combined in any number of ways. Every one of the components are capable of being implemented alone in hardware or combined in part or as a whole and implemented in a computer program having program modules residing in computer readable media and causing a processor or microprocessor to execute functions of the hardware equivalents. Codes or code segments to constitute such a program are understood by a person skilled in the art. The computer program is stored in a non-transitory computer readable medium, which in operation realizes the embodiments of the present disclosure. The computer readable medium includes a magnetic recording medium and/or an optical recording medium, in some embodiments.

According to various embodiments of the present disclosure as described above, in case of partitioning a current CU to be encoded into one or more PUs for generating one or more predicted blocks having predicted values approximated to the original pixels of the current CU, the performance of encoding/decoding is improved. In addition, the present disclosure as described above enables a motion information merge between PUs in a CU towards an even more efficient encoding/decoding.

Some embodiments as described above are implemented in the form of one or more program commands that are read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not limited by the explicitly described above embodiments but by the claims and equivalents thereof.

The invention claimed is:

1. A video decoding method performed by a processor, the method comprising:

decoding one or more quantized transform blocks from a bitstream;

extracting prediction unit (PU) mode information indicating a prediction unit (PU) mode of a current coding unit (CU) among a plurality of PU modes relating to types of partition of the current CU into PUs, wherein the plurality of PU modes includes a horizontally longer mode and a vertically longer mode;

inversely quantizing the one or more quantized transform blocks to generate one or more transform blocks;

inversely transforming the one or more transform blocks to reconstruct a residual block of the current CU;

generating one or more predicted blocks of the current CU by predicting each PU within the current CU based on the PU mode; and adding the reconstructed residual block and the generated predicted block wherein the one or more predicted blocks is generated by using motion information selected from a plurality of merge candidates corresponding to neighboring blocks, based on a merge index, and the merge candidates are generated by predetermined positions and priorities corresponding to the positions, wherein the merge candidates are generated in consideration of a position of a current PU in the current CU and the PU mode, wherein the merge candidates include at least one of a left block A, an upper block B, an upper-right block C, a left-lower block D and an upper-left block E and the priorities correspond to an order of the left block A, the upper block B, the upper-right block C, the left-lower block D and the upper-left block E, and wherein at least one of the neighboring blocks is excluded from the merge candidates when the PU mode corresponds to the horizontally longer mode or the vertically longer mode and the position of the current PU corresponds to a predetermined condition, without considering motion information of the at least one of the neighboring blocks, wherein the at least one of the neighboring blocks excluded from the merge candidates is a first neighboring block corresponding to a horizontal edge when the PU mode corresponds to the horizontally longer mode and is a second neighboring block corresponding to a vertical edge when the PU mode corresponds to the vertically longer mode.

2. The method of claim 1, further comprising extracting the merge index of the current PU within the current CU from the bitstream, and wherein the merge index is for indicating a merge candidate among merge candidates corresponding to neighboring blocks, the indicated merge candidate corresponding to motion information of the current PU.

* * * * *